(12) United States Patent
White et al.

(10) Patent No.: US 10,523,577 B2
(45) Date of Patent: Dec. 31, 2019

(54) SYSTEMS AND METHODS FOR LOW LATENCY DOCSIS QUEUEING AND SCHEDULING

(71) Applicant: CABLE TELEVISION LABORATORIES, INC, Louisville, CO (US)

(72) Inventors: Gregory Charles White, Louisville, CO (US); Steve Glennon, Lafayette, CO (US); Karthik Sundaresan, Boulder, CO (US); Luis Alberto Campos, Superior, CO (US)

(73) Assignee: Cable Television Laboratories, Inc, Louisville, CO (US)

( * ) Notice: Subject to any disclaimer, the term of this patent is extended or adjusted under 35 U.S.C. 154(b) by 0 days.

(21) Appl. No.: 15/987,836

(22) Filed: May 23, 2018

(65) Prior Publication Data

US 2018/0343206 A1 Nov. 29, 2018

Related U.S. Application Data

(60) Provisional application No. 62/509,887, filed on May 23, 2017.

(51) Int. Cl.
| | |
|---|---|
| *H04L 12/28* | (2006.01) |
| *H04L 12/869* | (2013.01) |
| *H04L 12/801* | (2013.01) |
| *H04L 12/851* | (2013.01) |
| *H04L 12/863* | (2013.01) |

(52) U.S. Cl.
CPC .......... *H04L 47/58* (2013.01); *H04L 12/2801* (2013.01); *H04L 47/11* (2013.01); *H04L 47/2441* (2013.01); *H04L 47/6215* (2013.01)

(58) Field of Classification Search
CPC ........... H04B 3/32; H04B 3/487; H04L 47/58; H04L 5/0039; H04L 12/2801; H04L 47/11; H04L 47/2441; H04L 47/76
See application file for complete search history.

(56) References Cited

U.S. PATENT DOCUMENTS

| | | | |
|---|---|---|---|
| 2009/0190470 A1* | 7/2009 | Hinosugi | H04L 47/2441 370/230.1 |
| 2013/0129005 A1* | 5/2013 | Xia | H04L 1/007 375/295 |
| 2015/0081863 A1* | 3/2015 | Garg | H04L 41/00 709/223 |
| 2017/0019343 A1 | 1/2017 | De Schepper et al. | |
| 2018/0294941 A1* | 10/2018 | Chapman | H04L 5/003 |

FOREIGN PATENT DOCUMENTS

| | | |
|---|---|---|
| EP | 2869514 A1 | 5/2015 |
| EP | 3070893 A1 | 9/2016 |
| JP | 2016535508 A | 11/2016 |
| WO | 201709715 A1 | 1/2017 |

* cited by examiner

*Primary Examiner* — Khanh C Tran
(74) *Attorney, Agent, or Firm* — Armstrong Teasdale LLP

(57) ABSTRACT

A scheduling device for managing a packet queue of a communication gateway includes a receiving portion configured to receive data packets according to at least one communication protocol, a processor, and classification module configured to separate the received data packets into a first traffic queue and a second traffic queue separate from the first traffic queue. The first traffic queue includes a low latency service flow classified to have strict priority. The second traffic queue includes a primary service flow classified as having a classic priority.

21 Claims, 3 Drawing Sheets

SYSTEMS AND METHODS FOR LOW LATENCY DOCSIS QUEUEING AND SCHEDULING

RELATED APPLICATIONS

This application claims the benefit of and priority to U.S. Provisional Patent Application Ser. No. 62/509,887, filed May 23, 2017, the disclosure of which is herein incorporated by reference in its entirety.

FIELD

This disclosure relates in general to the field of communications and, more particularly, techniques for managing flow over wireless access and wireline networks.

BACKGROUND

Today's communication systems may include separate wireless and wireline portions, each of which may be owned and controlled by the same or different operators. Present cable network operators, such as Multiple System Operators ("MSOs"), use Data Over Cable Service Interface Specification ("DOCSIS") networks for backhauling Internet traffic, but separate networks, including mobile networks, other DOCSIS networks, Wi-Fi networks, and radio networks have limited to no visibility into parts of the other network types. Each network type, whether DOCSIS or LTE, etc., may have separate traffic scheduling algorithms, and may experience higher latency due to internetwork visibility and communication.

FIG. 1 is a schematic illustration of a conventional upstream DOCSIS network 100. In the upstream direction, network 100 includes a Wi-Fi device 102, which communicates with a gateway 104 over a wireless communication pathway 106. Conventionally, wireless communication pathway 106 may be an 802.11ac wireless communication protocol. Gateway 104 may include, for example, a cable modem (CM) 108, or alternatively, gateway 104 is coupled with a CM 108.

Gateway 104 communicates with a cable modem termination system (CMTS) 110 over connection 112 using a DOCSIS 3.1 protocol. Connection 112 may be, for example, a coaxial cable or a fiber-optic link. CMTS 110 sends the DOCSIS 3.1 upstream traffic to a cable network 114, which may include operable communication with the Internet and/or Cloud, as well as one or more applications for utilizing the upstream data.

In operation, DOCSIS network 100 will experience latency in the upstream traffic as a result of several factors. For example, queuing delays may result primarily from traditional transfer control protocol (TCP) flows that send traffic faster than the link rate of network 100. The upstream traffic will be sent until a packet drop occurs. In such instances, the upstream traffic may be paused to let the queue drain. Such occurrences create a bottleneck link that results in poor latency performance for other applications that are sharing the bottleneck link.

Some recent Active Queue Management (AQM) techniques have been proposed to improve the traffic flow over the network, such as Proportional Integral Controller Enhanced (PIE), Controlled Delay (CoDel), Fair/Flow Queueing+CoDel (the "fq_codel" variant), Bottleneck Bandwidth and Round trip time (BBR, a congestion avoidance algorithm), Low Latency Low Loss Scalable throughput (L4S), DualQ, TCP-Prague, congestion exposure (ConEx), Data Center TCP (DCTCP), and Accurate Explicit Congestion Notification (Accurate ECN). The DOCSIS specifications have accordingly been updated to adopt the results of these various techniques as the research therefrom becomes available, and thus the buffer control in DOCSIS version 3.0 (D3.0) has achieved an order of magnitude reduction in latency under load, and the AQM in DOCSIS version 3.1 (D3.1) is achieved another order of magnitude reduction in steady-state latency under load. However, these advances have not kept pace with the increases in traffic and speed over present communication networks.

ECN, for example, is an extension of TCP/IP. ECN allows a router to send congestion signals without dropping packets, namely, by marking packets instead of dropping them. TCP congestion controls are algorithms for controlling the sending rate of network devices, and to adjust the sending rate according to available bandwidth. DCTCP is a scalable congestion control that uses slow-start and fast-recovery/fast-retransmission. AQM thus generally refers to techniques for controlling the filling levels and delays of queues. PIE is considered to be a more complex AQM that implements present and past queuing delays to calculate drop probabilities. L4S implements separation, identification, and scalable congestion control, and DualQ AQM expands upon L4S by using an ECN Capable Transport (ECT) codepoint to classify incoming packets, and then separate traffic into two different queues. One of the DualQ queues is dedicated for L4S traffic, and the other queue is dedicated for "classic" traffic. The separate queues of the DualQ AQM are useful for some latency reduction. However, it is desirable to further reduce latency while enabling deterministic latency for latency-sensitive packets, and particularly with respect to upstream traffic congestion.

SUMMARY OF THE INVENTION

In an embodiment, a scheduling device for managing a packet queue of a communication gateway is provided. The scheduling device includes a receiving portion configured to receive data packets according to at least one communication protocol, a processor, and classification module configured to separate the received data packets into a first traffic queue and a second traffic queue separate from the first traffic queue. The first traffic queue includes a low latency service flow classified to have strict priority. The second traffic queue includes a primary service flow classified as having a classic priority.

In an embodiment, a method of scheduling incoming data traffic over a communication network by an electronic device of the communication network implementing at least one processor is provided. The method includes steps of classifying packets of the incoming data traffic as being one of latency-sensitive and latency-insensitive, separating the classified packets into a first traffic queue having strict priority and a second traffic queue having classic priority, determining first parameters of the separated packets for a communication protocol of the communication network, calculating second parameters of the separated packets for the communication protocol, establishing initial traffic conditions of the incoming data traffic, building a MAP for the separated packets, and generating results of the calculations of the separated packets over the first and second traffic queues.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1:
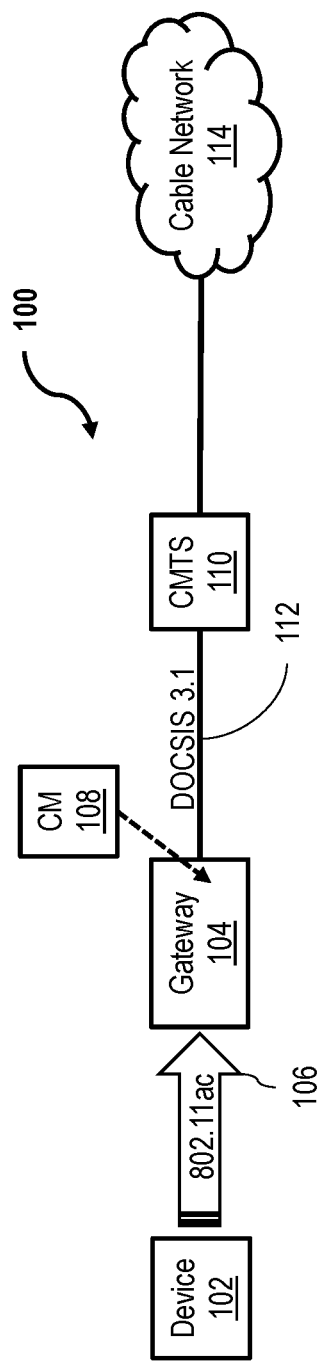
FIG. 1 is a schematic illustration of a conventional upstream DOCSIS network.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The systems and methods described below provide a multiple-component low latency DOCSIS ACM scheme that improves queuing and upstream scheduling in comparison with recent ACM techniques. In an exemplary embodiment, the present low latency DOCSIS techniques improve over existing queuing techniques by establishing at least two queues per service flow (SF), with the one of the two queues having strict priority queuing. This technique is different from the conventional DualQ ACM in that the present systems and methods may be configured to direct the low latency upstream traffic from the strict priority queue into a separate channel from the other queue, which may implement DualQ ACM according to conventional techniques, but still intermingle the primary (high-priority) and secondary ("classic" priority) service flows of the DualQ ACM along the same upstream channel, as described further below.

The present systems and methods thus extend the capabilities of techniques like DualQ ACM beyond what is conventionally practiced. As described herein, and illustrated in the accompanying figures, the low latency queuing improvements of the present embodiments further allow application-limited traffic (i.e., non-congesting traffic) to share the high priority queue of the DualQ service flow, even if the application-limited traffic originates from the strict priority queue. Such non-congesting traffic could include traffic that is not marked as ECT(1), but which is compatible with L4S traffic that is sent over the high-priority service flow of the other queue. In an exemplary embodiment, the present scheme implements a default behavior to map the Differentiated Services Code Point (DSCP) equal to "Expedited Forwarding" User Datagram Protocol (UDP) packets to the high priority queue. The present embodiments further enable configuration for other classified traffic, and protection and/or policing of the queue to enforce non-congestion.

In an exemplary embodiment, Bloom filter-based queue protection may be implemented. In this example, the high priority queue maintains a Bloom filter (bitmap) that is m-bits long: B. For packets entering the high priority queue, k hashes of the header tuple are calculated to create a Bloom filter value P. If (P==B & P), and for a bitwise AND, the packet is discarded. Otherwise, if B=P|B, for a bitwise OR to update Bloom filter. Accordingly, when the queue becomes empty, the Bloom filter is reset, namely, B=0. In some embodiments, this queue protection is implemented to enforce non-ECT(1) traffic. In other embodiments, this queue protection is implemented to enforce all traffic. According to the advantageous properties realized according to this exemplary embodiment, enforcement may be implemented for any flow to have at most one packet in the queue, while also discouraging aggregated high-priority service flow traffic from blocking the lower priority queue. In at least one embodiment, further protection is implemented to prevent the cues from being flooded by traffic having unique tuples, incrementing port numbers.

In an exemplary embodiment, the queuing techniques described herein further address the problems encountered with respect to existing DOCSIS Continuous Concatenation and Fragmentation (CCF). Specifically, with a DOCSIS CCF, when a low-priority packet head is transmitted, a newly arrived high-priority packet is required to wait until the low-priority packet tail completes transmission. According to this exemplary embodiment though, the low-priority packet tail and the high-priority packet may both be sent if the requisite space exists. Otherwise, this exemplary embodiment enables system configuration to discard the low-priority packet tail, and transmit the high-priority packet instead, without waiting. According to this embodiment, the CCF Segment Header syntax may also be modified to enable the insertion of high-priority packets immediately, by "pausing" the low-priority CCF session temporarily. In this instance, the high-priority packets may nevertheless be subject to CCF as well.

The present systems and methods are therefore of particular usefulness with respect to improving the scheduling of upstream traffic. The two separate queue components advantageously enable both spread granting, and predictive scheduling. The spread grant improvements are realized in consideration of the practice of that CMTS schedulers typically operate over a 2 ms MAP interval, and give each service flow at most one grant per MAP interval. This operation thus results in a nominal 2 ms period between grants on a given upstream channel. According to the improved techniques of this example though, low-latency service flows are enabled such that grants may be scheduled more frequently. At least one embodiment, these more frequent grants are spread "quasi-equally" across all orthogonal frequency-division multiple access (OFDMA) frames in the interval.

The predictive scheduling improvements of the present embodiments are realized through a novel configuration of the upstream scheduler. In an exemplary embodiment, for low latency service flows, instead of being configured to strictly respond to received requests, an upstream scheduler (see FIG. 3, below) is configured to track an estimate of the bandwidth demand of each (active) service flow, and then proactively schedule the bandwidth according to the estimated demand. In one example, the upstream scheduler is configured according to an algorithm that: (i) categorizes low latency service flows as one of active and inactive; (ii) for each low latency service flow categorized as active, estimates the current bandwidth demand (e.g., by an exponentially weighted moving average (EWMA)) to obtain a value BW_estimate; (iii) for each MAP interval, predictively schedules the bandwidth by multiplying BW_estimate by a given factor; and (iv) constrains the predicted bandwidth grant to be within predetermined boundaries (e.g., minimum and maximum values), or above/below a predetermined default threshold. According to this exemplary embodiment, if a cable modem (CM) has used all of the many slots granted, the algorithm may be further configured to add a request value to the predicted grant.

Figure 2A:
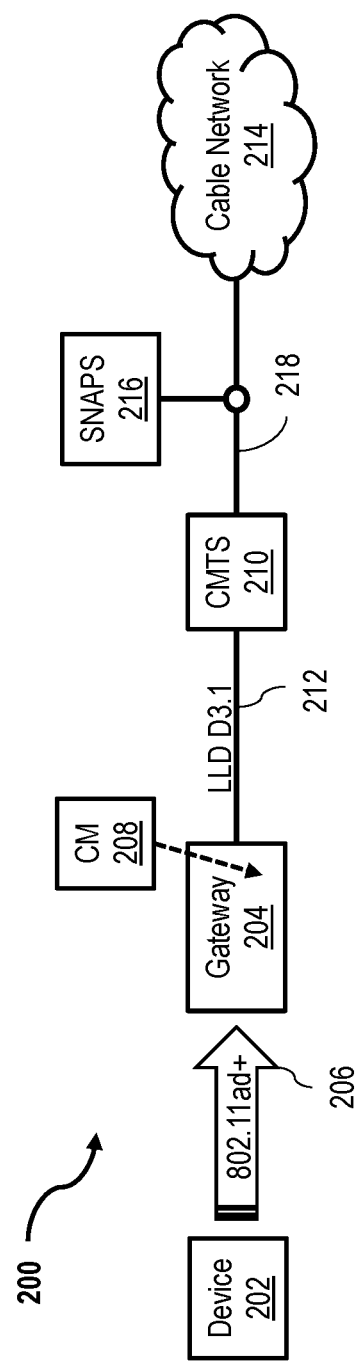
FIG. 2A is a schematic illustration of an exemplary upstream DOCSIS network for a wired gateway, according to an embodiment.

FIG. 2A is a schematic illustration of an exemplary upstream DOCSIS network 200 for a wired gateway. Network 200 is similar to conventional network 100, FIG. 1, except that network 200 implements the low latency DOCSIS techniques of the present systems and methods. As shown in the upstream direction, network 200 includes a Wi-Fi client device 202, which communicates with a gateway 204 over a wireless communication pathway 206. In the exemplary embodiment, wireless communication pathway 206 represents an 802.11ad+ wireless communication protocol, and gateway 204 includes or is coupled with a CM 208. Gateway 204 communicates with a CMTS 210 over connection 212 using a DOCSIS 3.1 protocol. Connection 212 may be, for example, a coaxial cable or a fiber-optic link. CMTS 210 sends the DOCSIS 3.1 upstream traffic to a cable network 214, which may include operable communication with the Internet and/or Cloud, as well as one or more applications for utilizing the upstream data.

Network 200 further includes an application infrastructure 216 along an upstream communication link 218 to cable network 214. In the exemplary embodiment, application infrastructure 216 implements Software Defined Networking (SDN)/Network Functions Virtualization (NFV) Application Development Platform and OpenStack project (SNAPS). Implementation of SNAPS is particularly useful in association with the NFV infrastructure, as well as Virtualization Infrastructure Managers (VIM) that presently utilized DOCSIS and DOCSIS 3.1, and enables deployment of end-to-end applications. Network virtualization provides a software simulation of a hardware platform, and functionality is separated from the hardware to run as a "virtual instance." The network virtualization of system 200 thus further enables the capability to create, modify, move, and terminate functions across the network in a stable, repeatable, and cost-effective platform. Snaps further provides transparent application programming interfaces (APIs) for the various infrastructures, and reduces complexity of integration testing. In at least one embodiment, application infrastructure 216 utilizes a virtual Converged Cable Access Platform (CCAP) core to control the cable plant and move packets to and from client device 202 to the customer sites. This exemplary configuration is advantageous to achieve further low latency and backhaul optimization, while also realizing additional bandwidth savings and increased maximum frame size.

Figure 2B:
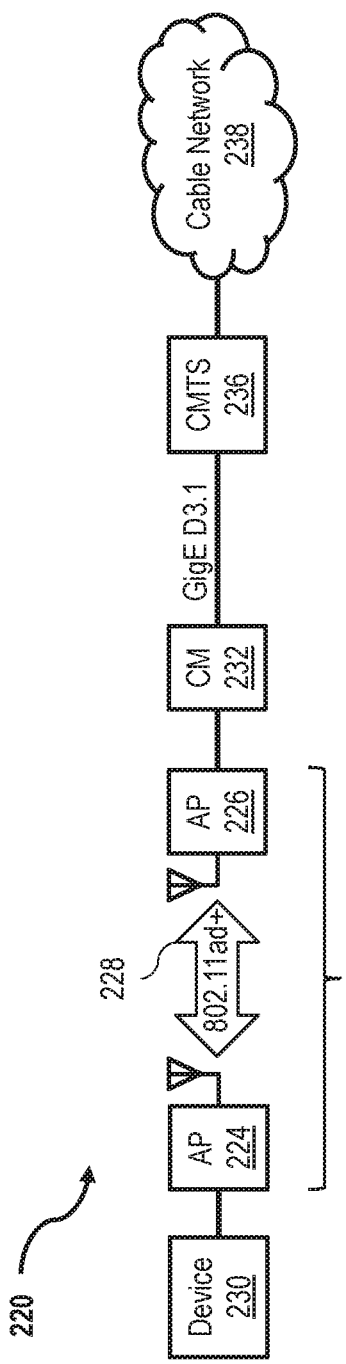
FIG. 2B is a schematic illustration of an exemplary upstream DOCSIS network for a wireless gateway, according to an embodiment.

FIG. 2B is a schematic illustration of an exemplary upstream DOCSIS network 220 for a wireless gateway. Network 220 is similar to network 200, FIG. 2A, except that network 220 illustrates a wireless communication gateway 222. In the exemplary embodiment, wireless communication gateway 222 includes at least one downstream access point (AP) 224 and at least one upstream AP 226. In this example, downstream AP 224 and upstream AP 226 communicate over a wireless communication pathway 228, which may utilized and 802.11ad+ communication protocol. Downstream AP 224 receives upstream data traffic from a client device 230, and sends the upstream data traffic to upstream AP 226, which is in operable communication with a CM 232. In an optional embodiment, CM 232 defaults to a TCP version in an ns-3 transport layer. CM 232 manages the upstream traffic according to the low latency techniques described herein, and sends the managed upstream traffic over a communication link 234 (e.g., cable, fiber, etc.) to a CMTS 236. In the optional embodiment, communication link 234 may be a Gigabit Ethernet connection, and CMTS 236 defaults to the same TCP version in the ns-3 transport layer as CM 232. CMTS 236 then transmits the managed upstream traffic to a cable network 238.

According to the embodiments described herein, a more realistic approach is provided to reduce latency for DOCSIS networks. Such additional latency reductions are achieved according to the implementation of an innovative upstream scheduler, as described below with respect to FIG. 3. In the exemplary embodiment, the upstream scheduler is implemented in, or in association with, CM 208, FIG. 2A, and/or CM 232, FIG. 2B. In other embodiments, the upstream scheduler may be implemented in, or in association with, CMTS 210 and/or CMTS 236, respectively.

Figure 3:
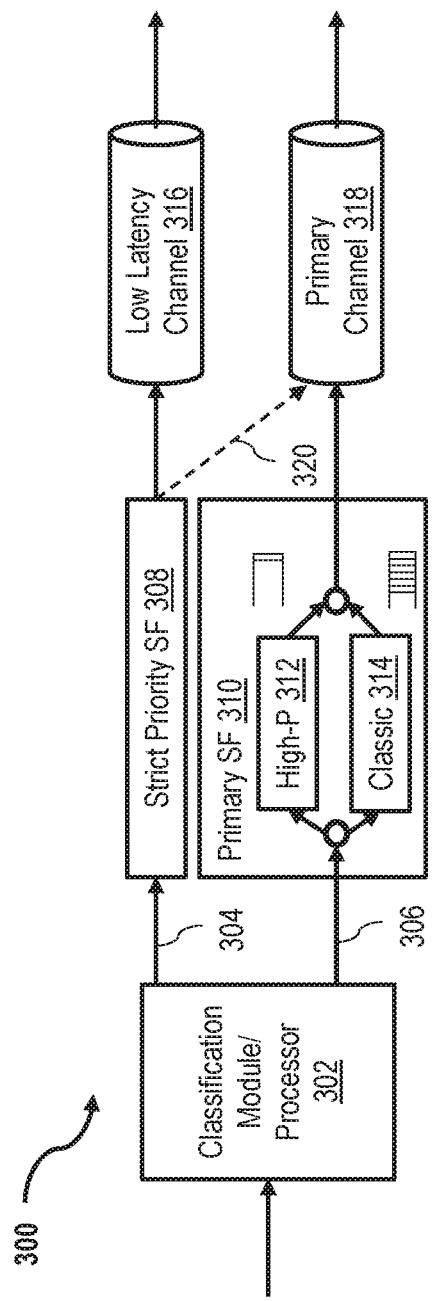
FIG. 3 depicts a schematic illustration of an exemplary upstream scheduler, according to an embodiment.

FIG. 3 depicts a schematic illustration of an exemplary upstream scheduler 300. In an exemplary embodiment, scheduler 300 is implemented within the operation of a CM, but may alternatively, or additionally, be implemented within the operation of a CMTS. Scheduler 300 includes a classification module 302 that is configured to track the received upstream traffic and classify service flows as being one of active and inactive. Classification module 302 is further configured to estimate a bandwidth demand for each active service flow and proactively schedule the bandwidth according to the estimated demand. In at least one embodiment, classification module 302 includes, or utilizes, a processor (not shown) to implement one or more algorithms according to the techniques described above.

In operation, classification module 302 separates the upstream traffic into a first traffic queue 304 and a second traffic queue 306. First traffic queue 304 is dedicated to sending a low latency service flow 308, and second traffic queue 306 is dedicated to sending a primary service flow 310. Low latency service flow 308 is classified by classification module 302 as having strict priority, whereas primary service flow 310 is classified by classification module 302 as having "classic" priority. In at least one embodiment, primary service flow 310 implements a DualQ ACM scheme, which further divides the classic priority into a first intermediate service sub-flow 312 having high-priority (e.g., L4S) and a second intermediate service sub-flow 314 having low (i.e., classic).

As can be seen from the example illustrated in FIG. 3, the high-priority first intermediate service sub-flow 312 is different from the strict priority low latency service flow 308. The strict priority low latency service flow 308, for example, is transmitted upstream on a separate low latency upstream channel 316, whereas both intermediate service sub-flows 312, 314 are managed such that the entirety of primary service flow 310 is transmitted by way of the same primary upstream channel 318. In an example of operation of scheduler 300, low latency upstream channel 316 sends one symbol per frame, and primary upstream channel 318 sends six symbols per frame.

In an optional embodiment, scheduler 300 is further configured to additionally separate from first traffic queue 304 and low latency service flow 308 any or all application-limited, non-congesting traffic, and send such non-congesting traffic along a redirect 320 in order to share high priority service flow 312 of primary service flow 310 (i.e., the DualQ service flow). In this optional embodiment, the non-congesting traffic may be pre-designated (e.g., by the traffic center, not shown) as traffic that is not marked as ECT(1), but which is compatible with the high-priority L4S traffic of first intermediate service sub-flow 312. According to this optional embodiment, the latency reduction benefits achieved according to conventional DualQ ACM techniques are further extended through the implementation of strict priority queuing, and without having to sacrifice any of the benefits presently achieved by DualQ ACM.

As also described above, upstream scheduler 300 further enables predictive scheduling by estimating the bandwidth demand, BW_estimate, of each active service flow, and then, in the exemplary embodiment, proactively schedules the bandwidth by multiplying BW_estimate by factor to obtain a predicted bandwidth grant. In some embodiments, the predicted bandwidth grant may be constrained within predetermined boundaries or upper/lower threshold limits, and a request value may be added to the predicted grant if all slots of the predicted grant have been used.

A proof of concept of the advantageous results described above and depicted in FIG. 3 has been obtained through a virtualized ideal scheduler simulation that assessed present DOCSIS system performance testing data (D3.0) and then performed virtualized testing for a D3.1 implementation that factored known CMTS constraints into the simulations. The virtualized simulations included both a Matlab simulation and an ns-3 simulation. The ns-3 simulation was implemented for circumstances able to (i) port existing D3.0 ns-2 implementation to ns-3, (ii) update implementation for D3.1 framing, and (iii) enhance to support multi-CM scenarios.

The embodiments described above are discussed with respect to a conventional cable network. Other embodiments that are contemplated herein utilize an optical network. Such an optical network may, for example, be formed with an Optical Network Terminal (ONT) or an Optical Line Termination (OLT), and an Optical Network Unit (ONU), and may utilize optical protocols such as EPON, RFOG, or GPON. Other embodiments that are contemplated include communication systems capable of x-hauling traffic, as well as satellite operator communication systems, Wi-Fi networks, MIMO communication systems, microwave communication systems, short and long haul coherent optic systems, etc. X-hauling is defined herein as any one of or a combination of front-hauling, backhauling, and mid-hauling. In these additional embodiments, the CMTS described above may be substituted with, or additionally include, a termination unit such as an ONT, an OLT, a Network Termination Unit, a Satellite Termination Unit, and other termination systems collectively referred to as "Modem Termination Systems (MTS)". Similarly, the CM described above may be substituted with, or additionally include, a satellite modem, an Optical Network Unit (ONU), a DSL unit, etc., which are collectively referred to as "modems." Furthermore, the DOCSIS protocol may be substituted with, or further include protocols such as EPON, RFoG, GPON, Satellite Internet Protocol, without departing from the scope of the embodiments herein.

Additionally, although the embodiments herein are described primarily with respect to upstream traffic, scheduler 300 may also be similarly implemented for downstream traffic, and therefore may be located within the operation of the CMTS in an exemplary embodiment. Although upstream traffic often includes different considerations than would the downstream traffic (e.g., upstream traffic is often considered more "bursty"), downstream traffic nevertheless also experiences latency problems, which will be improved according to the present techniques.

In further exemplary operation, scheduler 300 is configured with respect to MAP Intervals less than 2 ms. The algorithms described above thus further advantageous in that they may be easily adjusted in the virtual environment to optimize benefits and tradeoffs (e.g., between efficiency and latency) of the respective parameters. Through implementation of scheduler 300, low latency upstream channel 316 we can be managed to enforce sending of only single-symbol codewords, that is, no codewords are sent that traverse multiple symbols. In the exemplary embodiment, low latency channel 316 is optimally disposed within a portion of the spectrum that is not susceptible to burst noise, thereby further preventing interleaving, while also avoiding LTE channels and low frequency channels. In at least one embodiment, low latency channel 316 is smaller than primary channel 318, but may be sized in accordance with the amount of low latency traffic. Low latency channel 316 may further include wide subcarrier spacing (e.g., 50 kHz) to reduce symbol period, and optionally, a single modulation profile.

Scheduler 300 is further useful with respect to downstream traffic in that it enables enforcement of the maximum downstream latency type length value (TLV) parameters, and optionally may require operating conditions that were previously only recommended. In some downstream embodiments, the Network Side Interface (NSI) may be made to greater than the radio frequency interface (RFI), and the disposition of the RFI within the communication network may further be redefined. Scheduler 300 is further adaptable to Hybrid Automatic Repeat reQuests (HARQs) in both the upstream and the downstream traffic, further enables minislot duration reduction in the upstream direction.

The exemplary embodiments above are described with respect to the implementation of a conventional 802.11ad wireless link. Nevertheless, the present embodiments may alternatively implements a dedicated channel to each station/AP. Furthermore, in the case of a relatively small number of stations and wide channels, the embodiments above may be further optionally configured to implement use beamforming, or dedicated frequency division duplexing/frequency division multiple access (FDD/FDMA) to create a dedicated "always available" pair of unidirectional channels to each station. Alternatively, such configurations may implement time division duplexing (TDD).

Figure 4:
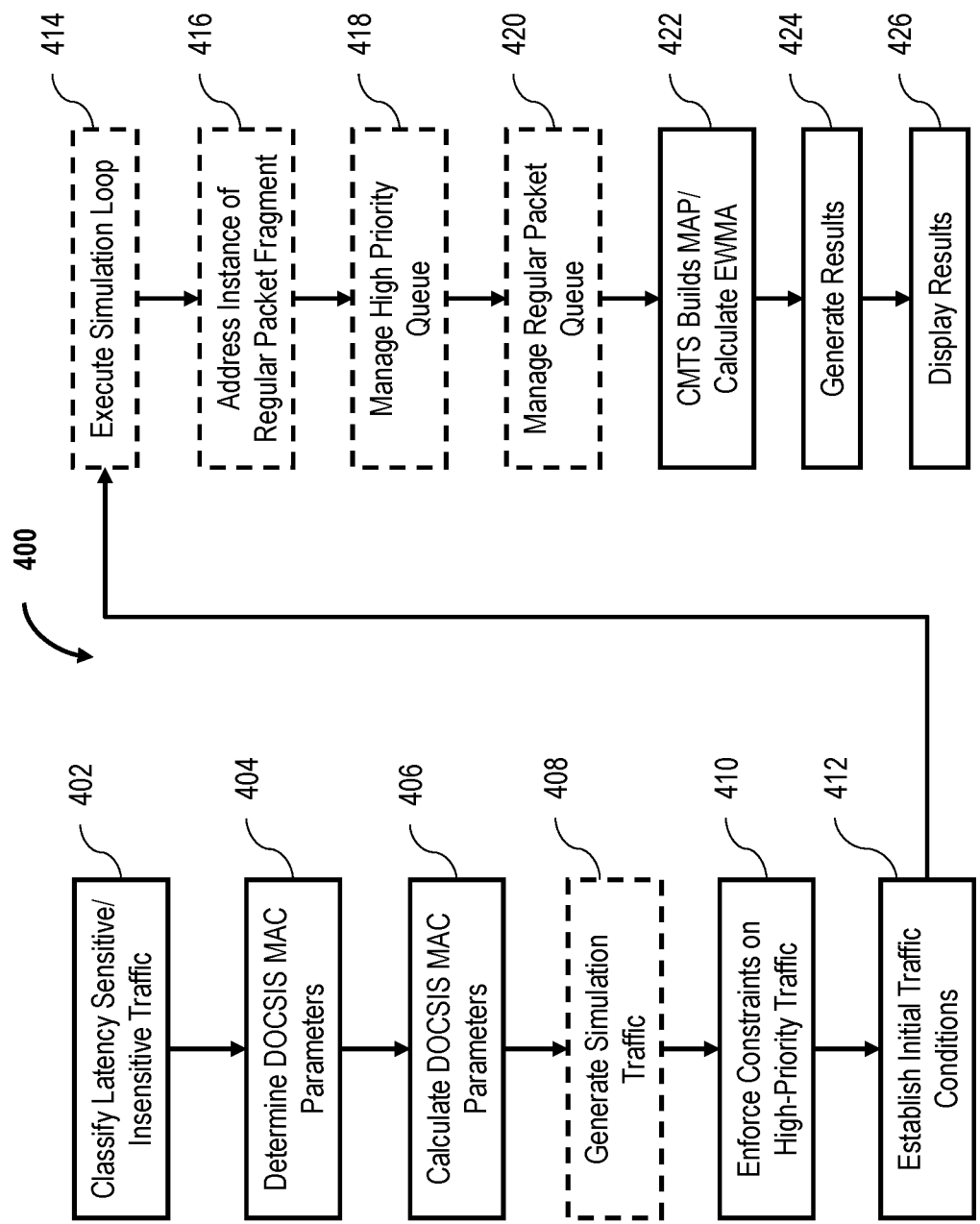
FIG. 4 is a flow chart diagram of an exemplary dual channel queue process for scheduling latency-sensitive traffic and latency-insensitive traffic, according to an embodiment.

FIG. 4 is a flow chart diagram of an exemplary dual channel queue process 400 for scheduling latency-sensitive traffic and latency-insensitive traffic. Process 400 may be implemented, for example, by a processor (e.g., through computer-executable instructions) and, or in cooperation with, scheduler 300, FIG. 3. Process 400 begins at step 402, in which incoming upstream traffic is classified as being one of latency-sensitive and latency-insensitive traffic. In step 404, process 400 determines the DOCSIS MAC parameters, including without limitation one or more of a subcarrier spacing, symbols per frame, a MAP interval, a round trip time (RTT) and/or 2-way propagation delay, a downstream interleaving delay, a MAP proc time of the CMTS, a MAC HDR size (in bytes), a latency target value, a maximum number of consecutive frames tolerable with zero grants, a minimum number of mini slots to grant in a frame, a maximum sustained rate, and an indicator value representing the speed at which the grant rate ramps down.

In step 406, process 400 calculates DOCSIS MAC parameters including without limitation one or more of a number of subcarriers per minislot, an OFDMA frame duration (in seconds), a number of minislots per frame (which may be rounded to account for upstream imperfections), a minislot capacity (in bytes), a CM MAP proc time, a CMTS receiver proc time (i.e., the time the CMTS waits for an entire frame to arrive before processing), a minimum request grant delay, a number of OFDMA frames in each MAP interval, a maximum grant interval, a minimum grant, a maximum grant. Step 408 is an optional step, which may be implemented in the case of a simulation. In step 408, process 400 generates traffic according to the parameters determined in step 404 and calculated in step 406. Where process 400 is implemented on existing traffic, step 408 may be avoided.

In step 410, process 400 enforces constraints on some or all of the high-priority traffic. In step 412, process 400 establishes initial traffic conditions, including without limitation a number of minislots granted in each frame, a number of minislots actually used by the CM in each frame, an ideal grant value, a depth of the remaining queue at the end of each frame, how many MAP intervals have been scheduled (in the case of a simulation of process 400, prior to the start of the simulation), a number of minislots per frame for the first k MAP intervals, a time that each regular packet arrives at the CMTS, a pointer to the last transmitted regular packet, a pointer to the last regular packet received at the CM, a time that each high-priority packet arrives at the CMTS, a pointer to the last transmitted high-priority packet, a pointer to the last high-priority packet received at the CM, and residual accounts for the fragment bytes of a packet that has already been sent.

Step 414 is an optional step, in the case where process 400 is implemented as a simulation. In step 414, process 400 executes a simulation loop that (i) performs CM side processing, (ii) updates for high-priority packets that have been received, and (iii) builds at least one first at least one frame in advance of the burst. In an exemplary embodiment of step 414, process 400 further executes a first sub-step 416 to address an instance where a regular packet has been fragmented, and sets an arrival time for the transmitted packet, and then builds, transmits, and decodes the packet. In a second sub-step 418 of step 414, process 400 manages the high-priority queue, and fills the grant with high-priority packets if the space remains in the grant and high-priority packets are waiting to be transmitted. In a third sub-step 420 of step 414, process 400 manages the regular packet queue, with regular packets if space remains in the grant and regular packets are waiting to be transmitted.

In step 422, process 400 causes the CMTS to build the next MAP. In an exemplary embodiment of step 422, process 400 calculates the EWMA of used minislots. Step 424 is an optional step. In step 424, process 400 generates results of the determination and calculation steps, including without limitation upstream latency statistics, tables, properties and totals of one or more of the several parameters described above. Step 426 is also an optional step. In step 426, process 400 causes a display device (not shown), which is in communication with the processor, to display one or more visual images relating to the results generated in step 424, including without limitation value plot and subplots, histograms, grids, titles and labels, legends, and panned wide displays or zoomed close-ups.

In an exemplary embodiment of step 426, such graphical plots may depict one or more of at least three separate low latency DOC SIS scheduler options. In a first of the three options, where no grant is received, process 400 may depict the signal from the CM or the CMTS as resembling a single square wave, where the rising edge of the square wave represents activation, the crest of the square wave represents a maximum value, and the trailing edge of the square wave represents a deactivation. In a second of the three options, where multiple grants per interval are received, process 400 may depict a plot resembling a rising and falling step function, with the various "steps" corresponding to the various instances of multiple grants. In the third of the three options, and also in the case where multiple grants are provided, each individual grant may be represented as resembling an individual square wave function in series. According to these advantageous embodiments, the length of an individual slot may be reduced in half (e.g., from 240 μs to 120 μs).

Low latency cannot be provided to all packets equally. However, according to the low latency DOCSIS techniques described herein, latency is reduced for all packets to some degree. Some conventional protocols are only able to obtain acceptable performance levels if the protocols are allowed to build up a large queue of packets inside the network (sometimes referred to as Queue-Building (QB) flows). Applications that do not need to build a queue to meet performance requirements are referred to as Non-Queue-Building (NQB) flows. The large packet queues of these QB flows will typically cause latency for all traffic, including the NQB flows. According to the embodiments herein though, two separate virtual paths are provided on the DOCSIS link, namely, one for QB flows, and the other for NQB flows. According to these advantageous systems and methods, QB flows can build up a large queue and still obtain desired performance levels, and the NQB flows can also obtain their own desired performance levels by avoiding the latency caused by the QB flows. The present embodiments thus enable an innovative "non-queue-building" variant of TCP that achieves line-rate throughput with minimal queueing delay. The techniques described herein enable scheduling such that the packets that do not cause delay will not be forced to wait for the packets that do cause delay, thereby rendering the present systems and methods of particular value to communication networks that have not implemented some of the more recent a AQM techniques.

The present embodiments further represents an improvement over conventional high-priority-vs-low-priority systems that merely provide preferential bandwidth access to a subset of traffic. The present embodiments do not include reservations or traffic contracts for different service flows, and no value judgments are made about the relative importance of some applications over others. That is, the present systems and methods still provide a "classic" queue for service flows implementing QB behavior which cannot fully utilize capacity without building a queue. NQB service flows, on the other hand, may utilize a separate short queue to avoid being stuck behind packets in the longer queue. Although both cues may be optimized for these two different types of traffic, neither queue is individually provided preferential access to bandwidth. Accordingly, the data traffic of one user will not impact the service of another user under these techniques.

Thus, implementation of the low latency DOCSIS techniques herein reduce delay of conventional AQM algorithms (e.g., DOCSIS-PIE, FQ-CoDel, etc.) by at least one additional order of magnitude. For example, the implementation of AQM two DOCSIS 3.1 reduced queuing delay under load from 100-200 ms to 10-20 ms. However, the $99^{th}$ percentile delay under this improvement was still approximately 100 ms, which is generally considered too great for many latency driven applications. The implementation of the present low latency DOCSIS techniques on top of conventional AQM techniques though, demonstrating to maintain the queuing delay below 1 ms at the $99^{th}$ percentile.

In some embodiments of the techniques described herein, service flows may mark individual packets as NQB, for example, using conventional ECN (e.g., "ECT(1)") or DiffServ Codepoint (DSCP) (e.g., "Expedited Forwarding") techniques. The present techniques though, further enable policing of the traffic flows in the event that a particular service flow is miscategorized, whether by accident or maliciously. The traffic scheduler of the present systems and methods is able to maintain a queuing score for the service flows that have recently impacted the queuing, and is configured to redirect packets having higher scores to the more appropriate queue (e.g., the classic queue). Such policing techniques are different than conventional techniques that merely limit bandwidth, in that according to the present embodiments, judgments are made based on the recent latency impact of each service flow, and thus the latency policing does not interfere with bandwidth allocations between flows.

Individual modems that support recent DOCSIS versions (e.g., D3.1) can be field-upgraded to implement the present systems and methods by way of a software update from the operator. Other modems may be upgraded by hardware modifications. Present systems and methods are advantageously applicable in cooperation with routers provided by either the operator or the customer. Accordingly, the techniques described herein are operable to reduce median latency for all traffic, but with no impact to TCP bulk data throughput. The present systems and methods require no additional configuration from the operator, but may flexibly be configured to provide operator control. The low latency DOCSIS techniques of the present embodiments are also applicable to LTE small cell backhaul in a DOCSIS environment Exemplary embodiments of systems and methods for low latency upstream traffic management and scheduling are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized with respect to downstream traffic, and in connection with other medication networks utilizing DOCSIS protocols or similarly compatible protocols.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A scheduling device for managing a packet queue of a communication gateway, comprising:
    a receiving portion configured to receive data packets according to at least one communication protocol;
    a processor; and
    a classification module configured to separate the received data packets into a first traffic queue and a second traffic queue separate from the first traffic queue,
    wherein the first traffic queue includes a low latency service flow classified to have strict priority,
    wherein the second traffic queue includes a primary service flow classified as having a classic priority,
    wherein the low latency service flow is routed to a low latency communication channel, a portion of the low latency service flow comprising non-congesting traffic, and
    wherein the primary service flow is routed to a primary communication channel separate from the low latency communication channel.

2. The scheduling device of claim 1, comprising a modem.

3. The scheduling device of claim 2, wherein the modem comprises one or more of a cable modem, a satellite modem, an optical network unit, and a DSL unit.

4. The scheduling device of claim 1, comprising a modem termination system (MTS).

5. The scheduling device of claim 4, wherein the MTS comprises one or more of a cable modem termination system, an optical network terminal, an optical line termination, a network termination unit, and a satellite termination unit.

6. The scheduling device of claim 1, wherein the at least one communication protocol comprises one or more of a data over cable service interface specification (DOCSIS), and 802.11 wireless communication protocol, and a transfer control protocol.

7. The scheduling device of claim 1, wherein the classification module is further configured such that the second traffic queue implements active queue management (AQM) on the primary service flow.

8. The scheduling device of claim 7, wherein the AQM comprises a management technique including one or more of proportional integral controller enhancement, controlled delay, fear/flow cueing, bottleneck bandwidth and round trip time, low latency loss scalable throughput, DualQ, TCP-Prague, congestion exposure, data center TCP, and accurate explicit congestion notification.

9. The scheduling device of claim 8, wherein the management technique is DualQ, and wherein the primary service flow includes a first intermediate sub-flow classified to have high-priority and a second intermediate sub-flow classified to have classic priority.

10. The scheduling device of claim 9, wherein the first intermediate sub-flow is separate from the second intermediate sub-flow, and wherein the high-priority classification is different than the strict priority classification.

11. The scheduling device of claim 1, wherein a portion of the low latency service flow is routed to the primary communication channel.

12. A method of scheduling incoming data traffic over a communication network by an electronic device of the communication network implementing at least one processor, comprising the steps of:
classifying packets of the incoming data traffic as being one of latency-sensitive and latency-insensitive;
separating the classified packets into a first traffic queue having strict priority and a second traffic queue having classic priority;
determining first parameters of the separated packets for a communication protocol of the communication network;
calculating second parameters of the separated packets for the communication protocol;
establishing initial traffic conditions of the incoming data traffic;
building a bandwidth allocation map (MAP) for the separated packets; and
generating results of the calculations of the separated packets over the first and second traffic queues.

13. The method of claim 12, wherein the communication protocol comprises a data over cable service interface specification.

14. The method of claim 12, wherein the electronic device comprises at least one of a cable modem and a cable modem termination system (CMTS).

15. The method of claim 14, wherein the step of the building is implemented by the CMTS.

16. The method of claim 12, further comprising the step of generating simulation traffic.

17. The method of claim 12, further comprising, after the step of establishing initial traffic conditions, the step of executing a simulation loop.

18. The method of claim 17, wherein the step of executing comprises addressing regular packet fragmentation, managing a high-priority queue, and managing a regular packet queue.

19. A scheduling device for managing a packet queue of a communication gateway, comprising:
a receiving portion configured to receive data packets according to at least one communication protocol;
a processor; and
a classification module configured to separate the received data packets into a first traffic queue and a second traffic queue separate from the first traffic queue,
wherein the first traffic queue includes a low latency service flow classified to have strict priority,
wherein the second traffic queue includes a primary service flow classified as having a classic priority,
wherein a first portion of the low latency service flow is routed to a low latency communication channel,
wherein the primary service flow is routed to a primary communication channel separate from the low latency communication channel, and
wherein a second portion of the low latency service flow is routed to the primary communication channel.

20. A scheduling device for managing a packet queue of a communication gateway, comprising:
a receiving portion configured to receive data packets according to at least one communication protocol;
a processor; and
a classification module configured to separate the received data packets into a first traffic queue and a second traffic queue separate from the first traffic queue,
wherein the first traffic queue includes a low latency service flow classified to have strict priority,
wherein the second traffic queue includes a primary service flow classified as having a classic priority,
wherein the second traffic queue implements, on the primary service flow, a DualQ active queue management technique, and
wherein the primary service flow includes (i) a first intermediate sub-flow classified to have high-priority, and (ii) a second intermediate sub-flow classified to have classic priority.

21. The scheduling device of claim 20, wherein the first intermediate sub-flow is separate from the second intermediate sub-flow, and wherein the high-priority classification is different than the strict priority classification.

* * * * *